Nov. 17, 1959  C. E. HURLBURT ET AL  2,912,864
DIRECTIONAL GYRO HAVING AN IMPROVED TORQUING DEVICE FOR
COMPENSATING FOR ERROR DUE TO THE EARTH'S ROTATION
Filed Jan. 6, 1958  3 Sheets-Sheet 1

INVENTORS
JOSEPH R. CONWAY
CHARLES E. HURLBURT
MICHAEL J. LANNI
BY
ATTORNEY

INVENTORS
JOSEPH R. CONWAY
CHARLES E. HURLBURT
MICHAEL J. LANNI
BY *Herbert ...*
ATTORNEY

INVENTORS
JOSEPH R. CONWAY
CHARLES E. HURLBURT
MICHAL J. LANNI

ATTORNEY

United States Patent Office 2,912,864
Patented Nov. 17, 1959

2,912,864

DIRECTIONAL GYRO HAVING AN IMPROVED TORQUING DEVICE FOR COMPENSATING FOR ERROR DUE TO THE EARTH'S ROTATION

Charles E. Hurlburt, River Edge, Joseph R. Conway, River Vale, and Michael J. Lanni, Ridgewood, N.J., assignors to Bendix Aviation Corporation, Teterboro, N.J., a corporation of Delaware Application January 6, 1958, Serial No. 707,357

3 Claims. (Cl. 74—5.4)

This invention relates to an improved means for applying an earth drift compensating torque to a directional gyro of a type such as disclosed schematically in copending U.S. application Serial No. 565,726, filed February 15, 1956 by Francis J. Thornton and Joseph R. Conway and assigned to Bendix Aviation Corporation.

More particularly, since such drift effect results from the rotation of the earth and varies at different latitudes, the present invention proposes novel means for achieving accurate correction by precessing the gyro by a novel electromagnetic torquer and associated operating circuit, together with control means readily accessible for operation by the pilot of an aircraft, whereby the direction and the value of the torque applied by the torquer may be adjusted to compensate for the drift effect prevailing at the different latitudes of the earth.

An object of the invention is to provide in a directional gyro a novel drift compensating torquer and control means to perform the desired function without encroaching on the space necessary for adequate gyroscopic momentum.

Another object of the invention is to provide a novel drift compensating torquer arrangement for a directional gyro in which a spherical cover mounted on an inner gimbal of the gyro is utilized as the rotating part of an eddy-current type torquer for the gyro by providing a strip or band of magnetic material secured to the sphere and extending circumferentially within the sphere and in cooperative relation with an electromagnetic type segmental two-phase torquer mounted in the outer gimbal of the gyro and about the horizontal axis of the inner gimbal to provide a reversible eddy-current motor torquer controlled by a potentiometer and a phase shifting capacitor so that the direction of rotation and value of the torque applied may be controlled by adjustment of a contact arm of the potentiometer.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
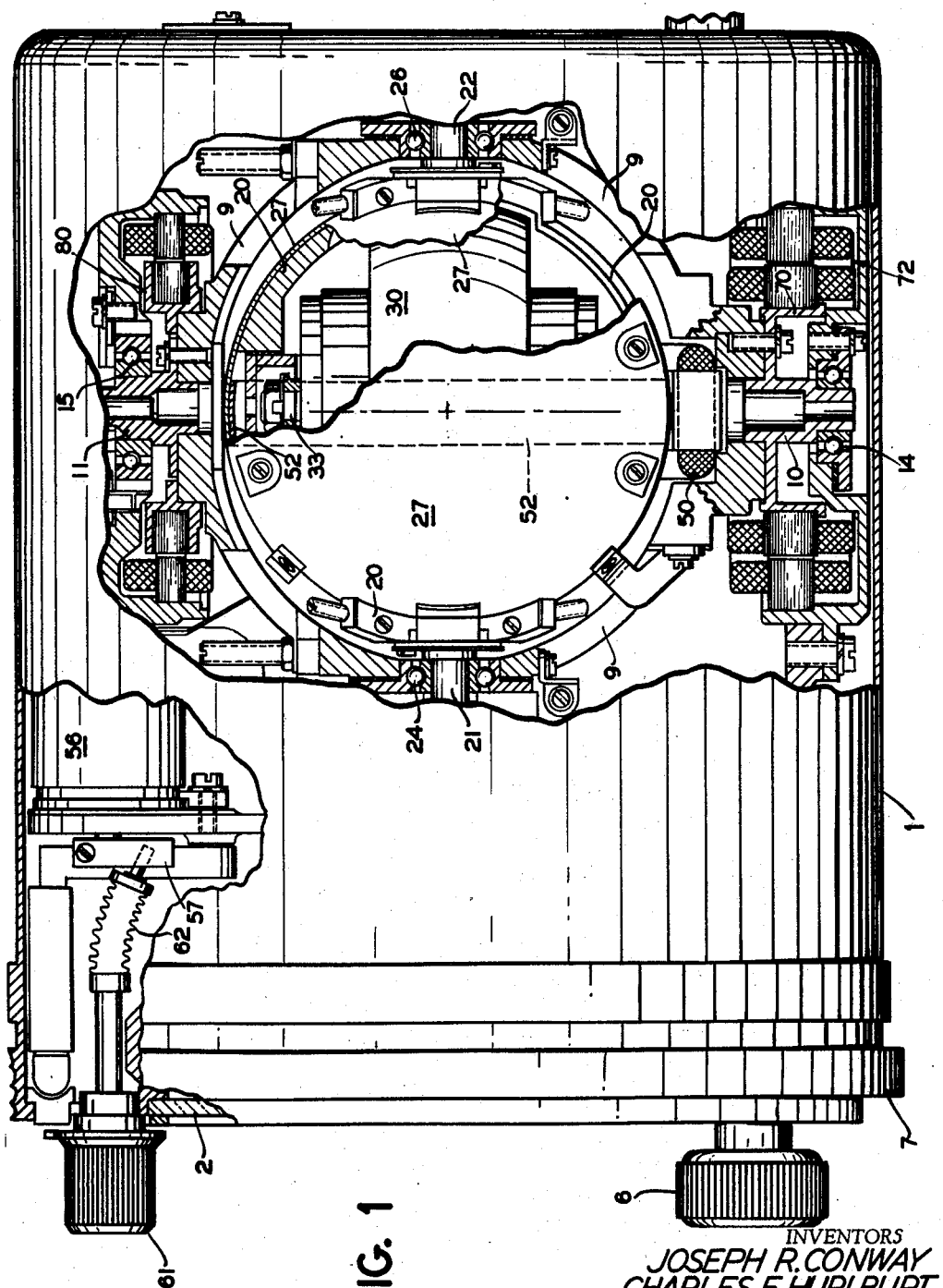
Figure 1 is a side view of a directional gyro instrument embodying the invention, with certain parts broken away and certain parts shown in section for better illustration thereof.
Figure 2:
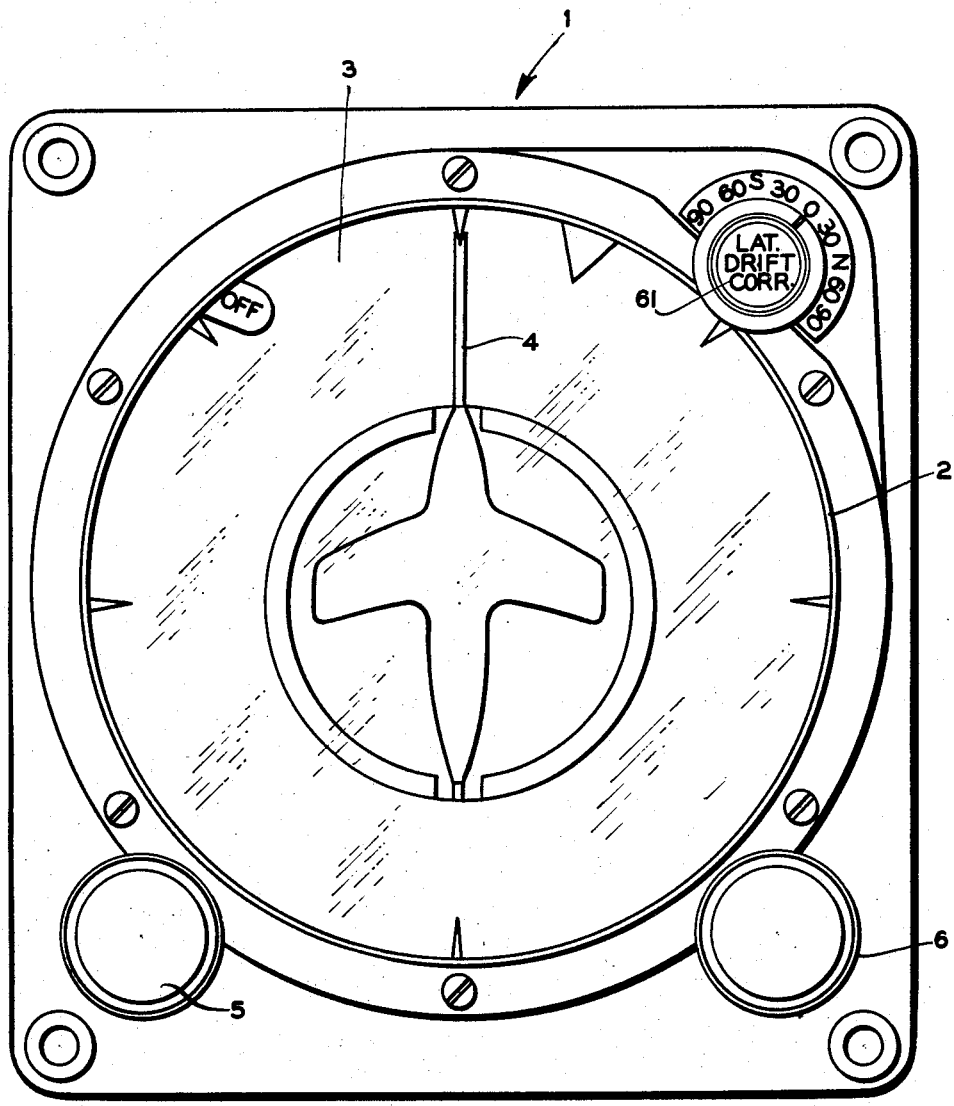
Figure 2 is a front view of the instrument of Figure 1 showing the face of the indicator dial and several control knobs.

Reference is now directed to the drawings wherein there is shown in Figures 1 and 2 an elongated can or casing 1 in which the subject invention is contained. The can is closed at its open or viewing end by vertically disposed bezel window 2. Rearwardly of the window there is provided a dial plate 3 cooperating with an indicator pointer 4 positioned relative one to the other by suitable means including pilot operative knobs 5 and 6 and servo motor means of conventional type embodied in the casing 1 and controlled by a directional gyro as shown schematically in the aforenoted U.S. application Serial No. 565,726.

The can 1 is intended to be fixed in the instrument panel of an aircraft in a position so that the dial faces the pilot. A bezel frame 7 surrounding the window 2 accommodates bolts for securing the instrument in the instrument panel of an aircraft.

The directional gyroscopic mechanism for controlling the relative position of the dial plate 3 and the indicator pointer 4 through suitable servo motor means is housed in the can 1 and only so much thereof as may be necessary to illustrate the present invention is shown in the drawings. The gyroscopic mechanism includes an outer gimbal 9 having vertical axis shafts 10 and 11 axially mounted in suitable housing supported bearings 14 and 15 for 360° of rotation. Located within the outer gimbal 9 is an inner gimbal 20 having a horizontal axis defined by trunnions 21 and 22 supported for rotation by bearings 24 and 26 carried in the outer gimbal 9. Mounted on the inner gimbal 20 is a spherical cover 27 of a light material such as aluminum, shown partially broken away in Figure 1. Within the spherical cover 27 and rotatably supported by the inner gimbal 20 is a gyro 30, the detail structure of which is not necessary to an understanding of the invention. The gyro, however, is of an electrically driven type having a spin axis 33 rotatably supported by the inner gimbal 20.

The spin axis 33 of the gyro 30 in normal operation of the instrument extends perpendicular to the vertical axis of shafts 10 and 11, of the outer gimbal 9 while the vertical axis of the outer gimbal shafts 10 and 11 is in turn perpendicular to the horizontal axis of the inner gimbal trunnions 21 and 22.

The spherical cover 27 is utilized as the rotor of an earth drift compensating torquer indicated generally by numeral 50. This is accomplished by providing a strip or band 52 of magnetic material extending circumferentially around the inner surface of the aluminum spherical cover 27, as best shown in Figure 1.

Figure 3:
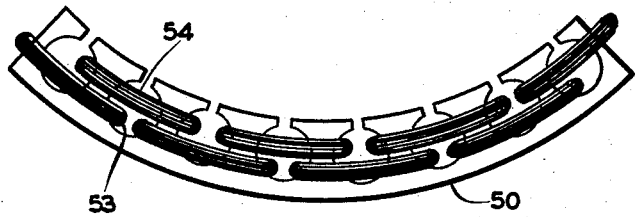
Figure 3 is a fragmentary side view of the two-phase torquer embodied in the instrument.

The plane of magnetic band 52 is in the same plane of that of the compensating torquer 50 which is shown in Figures 1 and 3 as of an electromagnetic type of two-phase torquer mounted in the outer gimbal 9. The torquer 50 is shown in detail in Figure 3, as having suitable two-phase windings 53 and 54, the energization of which is controlled by a potentiometer 56 having an adjustable contact arm 57 shown diagrammatically in Figure 4 and structurally in Figure 1.

A phase shifting capacitor 60 is connected across the potentiometer 56 so that when the potentiometer contactor arm 57 is in a center position no torque will be impressed through the windings 53 and 54 on the gyro element. Upon the contact arm 57 being set at one end of the potentiometer 56 the windings 53 and 54 are so arranged that maximum electromagnetic torque will be applied to the band 52 tending to rotate the sphere 27 in one direction while upon the contact arm 57 being adjusted to the opposite end of the potentiometer 56 maximum electromagnetic torque will be applied to the band 52 tending to rotate the sphere 27 in an opposite direction. The maximum torque positions on the potentiometer will correspond to the corrections required at the north and south poles while the no torque position will be applicable upon flight of the plane over the equator. The potentiometer 56 is controlled manually by the navigator by appropriate adjustment of the latitude drift corrector knob 61, shown in Figures 1 and 2, which knob is operably connected to the contact arm 57 of potentiometer 56 through a flexible coupling 62, as shown in Figure 1.

As shown in Figure 3 upon adjustment of the potentiometer arm 57 so as to effect a controlling energization of the phase winding 53, the gyro is biased in one direction of rotation by the torquer 50, while upon a controlling energization of the other phase winding 54, the gyro is biased in the opposite direction of rotation by the torquer 50. The value and sense of the torque applied to the spherical member 27 may be varied by adjustment of the contact arm 57 of the potentiometer 56 so as to provide the proper compensating effect for the latitude at which the plane is flying at a given time. During long flights through different latitudes, the pilot may effect suitable adjustment of the knob 61 so as to correct for the earth drift encountered under such changing latitude conditions.

As shown in Figure 1, the shaft 10 secured to the outer gimbal 9 is arranged to operatively position a rotor element 70 of a suitable synchro 72 so as to reflect azimuth indication of the directional gyro. The synchro 72 is suitably connected through a servo motor, as explained in the aforenoted U.S. application Serial No. 565,726, so as to effectively control the relative position of the indicator 4 and dial 3 and to thereby indicate to the pilot the direction of flight of the plane. The servo motor, while not shown, is conveniently mounted within the casing 1.

The shaft 11 affixed to the outer gimbal 9 is operatively connected to a leveling torquer motor 80 controlled in conventional manner by a suitable bank sensor switch, as explained in the aforenoted U.S. application Serial No. 565,726 so as to cause the gyro to precess into maintaining the spin axis of the gyro 30 perpendicular to the vertical axis 10—11 of the outer gimbal 9.

Figure 4:
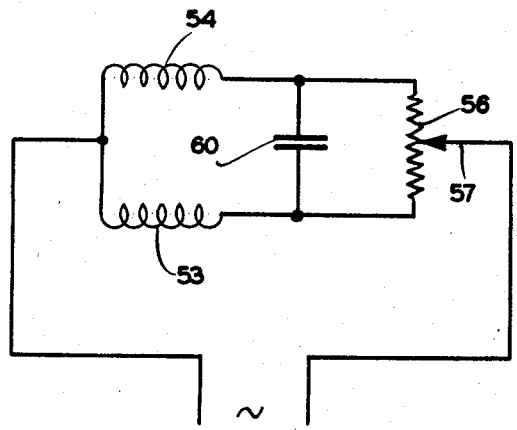
Figure 4 is a diagram of the control circuit for the two-phase torquer.

From the foregoing it will be seen that the spherical cover 27 and band 52 function as a rotor in cooperation with the electromagnetic torquer element 50 to produce the desired earth drift compensating torquing effect upon proper adjustment of the control circuit shown in Figure 4. Thus, when the required drift rate is determined, the potentiometer 56 may be adjusted by the pilot through operation of the latitude drift corrector knob 61 and contact arm 57 so as to apply the correct torque value for accurate navigation at the prevailing latitude.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a gyro of the directional type having a first gimbal pivotable on a first axis, a second gimbal pivotable on a second axis carried by said first gimbal and extending perpendicular to said first axis, a rotor having a spin axis carried by said second gimbal perpendicular to the second axis of said second gimbal, and direction indicator means operably connected to the first axis of the first gimbal; the improvement comprising a spherical cover for said gyro carried by said second gimbal, an electromagnetic core element carried by said first gimbal, two-phase exciting windings for energizing the electromagnetic core element so as to apply an electromagnetic torque to said spherical cover in opposite senses, a band of ferromagnetic material affixed to the spherical cover and positioned in the plane of the core element in cooperative relation therewith, an operator-operative means to selectively effect energization of said two-phase exciting windings so as to vary the sense and magnitude of the torque applied by said windings through the electromagnetic core element to said spherical cover so as to precess the gyro to compensate for earth drift effects at different latitudes of the earth.

2. In a gyro having a first gimbal pivotable on a first axis, a second gimbal pivotable on a second axis carried by said first gimbal and extending perpendicular to said first axis, and a rotor having a spin axis carried by said second gimbal perpendicular to the second axis of said second gimbal; the improvement comprising an electromagnetic core element carried by one of the gimbals, a band of magnetic material positioned in the plane of the core element in cooperative relation therewith, means for operatively connecting said band to the other gimbal, two-phase exciting windings for energizing the electromagnetic core element for applying a torque to the band in opposite senses, and means to selectively effect energization of the windings of the electromagnetic core element so as to vary the sense and magnitude of the torque applied by said windings to the band to precess the gyro.

3. The combination defined by claim 2 in which the last mentioned means includes a bridge circuit, the two-phase windings being connected in the bridge circuit so as to provide opposite arms thereof, a potentiometer connected in the bridge circuit so as to provide other arms thereof opposite to said windings, a capacitor connected across the potentiometer and the two-phase windings, said potentiometer including a variable contact arm, an electrical conductor leading from said variable contact arm, another electrical conductor leading from a point on said bridge circuit intermediate said two-phase windings, a source of alternating current connected across said electrical conductors, and operator-operative means for adjusting said variable contact arm of the potentiometer to selectively effect energization of the windings of the electromagnetic core element so as to vary the sense and magnitude of the torque applied by said windings to the band to precess the gyro.

References Cited in the file of this patent

UNITED STATES PATENTS

| | | |
|---|---|---|
| 1,390,471 | Sundhaussen | Sept. 13, 1921 |
| 2,415,813 | Curry et al. | Feb. 13, 1947 |
| 2,813,430 | Lehde | Nov. 19, 1957 |

FOREIGN PATENTS

| | | |
|---|---|---|
| 545,284 | Great Britain | May 19, 1942 |